(12) United States Patent
Lee et al.

(10) Patent No.: US 6,473,664 B1
(45) Date of Patent: Oct. 29, 2002

(54) MANUFACTURING PROCESS AUTOMATION SYSTEM USING A FILE SERVER AND ITS CONTROL METHOD

(75) Inventors: Sang-Hyun Lee; Sung-Jun Byun, both of Choongcheongnam-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/299,739

(22) Filed: Apr. 27, 1999

(30) Foreign Application Priority Data

Apr. 27, 1998 (KR) .............................. 98-14907

(51) Int. Cl.[7] .............................................. G06F 19/00
(52) U.S. Cl. .................................. 700/110; 716/4
(58) Field of Search .............................. 700/110, 105, 700/113, 115, 116; 716/4; 702/185

(56) References Cited

U.S. PATENT DOCUMENTS

| | | | | |
|---|---|---|---|---|
| 5,298,761 A | * | 3/1994 | Aoki et al. ................. 250/548 |
| 5,528,503 A | * | 6/1996 | Moore et al. ................. 700/95 |
| 5,536,128 A | * | 7/1996 | Shimoyashiro et al. ...... 414/273 |
| 5,751,581 A | * | 5/1998 | Tau et al. ................. 700/115 |
| 5,761,064 A | * | 6/1998 | La et al. ................. 700/110 |
| 5,857,192 A | * | 1/1999 | Fitting ................. 700/121 |
| 5,889,674 A | * | 3/1999 | Burdick et al. ............. 713/200 |
| 6,122,397 A | * | 9/2000 | Lee et al. ................. 382/141 |
| 6,185,474 B1 | * | 2/2001 | Nakamura et al. .......... 700/121 |
| 6,238,942 B1 | * | 5/2001 | Farnworth ................. 438/15 |
| 6,259,960 B1 | * | 7/2001 | Inokuchi ................. 700/110 |
| 6,314,379 B1 | * | 11/2001 | Hu et al. ................. 702/81 |

* cited by examiner

Primary Examiner—Leo Picard
Assistant Examiner—Zoila Cabrera
(74) Attorney, Agent, or Firm—McGuireWoods LLP; Hae-Chan Park

(57) ABSTRACT

In an automation system, a plurality of machines are connected to a file server via a network and the job result data produced by the machines, are shared by the file server. The job result data processed from a machine (for example, a tester) are stored in the file server. Another machine (for example, a repairer) can execute a job by using the above job result data.

34 Claims, 13 Drawing Sheets

MANUFACTURING PROCESS AUTOMATION SYSTEM USING A FILE SERVER AND ITS CONTROL METHOD

BACKGROUND OF THE INVENTION (a) Field of the Invention

The present invention relates to an automation system and its control method. More particularly, this invention relates to an automation system and its control method used in the fabrication of semiconductor devices, thin film transistor liquid crystal displays ("TFT-LCD"), etc.

(b) Description of the Related Art

An automation system utilized in a conventional TFT-LCD assembly line, as shown in FIG. 1, includes a plurality of machines 30a~30n, a plurality of machine servers 20a~20n that correspond one-to-one to those plurality of machines and a host 10 controlling the machine servers.

The machines 30a~30n. process a plurality of subjects such as glass, wafer, etc., stored in a work assembly 40 like a cassette under the control of machine servers. The machines 30a~30n send job result data on the subjects to the corresponding machine servers 20a~20n.

The automation system utilized in the conventional TFT-LCD assembly line is described referring to FIG. 1. In FIG. 1, suppose that a first machine 30a is a tester and a second machine 30b is a repairer.

First, the tester 30a picks up the glasses in the work assembly 40, the cassette, moving by an automatic guided vehicle ("AGV"), which is an automatic transport system controlled by a controller, and then tests the glasses respectively. The job result data on the glasses are stored in a hard disk in the tester. After the test, the cassette 40 moves to the repairer 30b by the AGV.

The repairer 30b needs to repair the glasses using the job result data from the previous tester 30a. In the conventional system, an operator directly copies the job result data stored in the hard disk, to a floppy disk and then input them to the repairer 30b. Based on the job result data, the repairer 30b repairs the glasses.

The conventional system is inconvenient because the job result data of the tester 30a have to be stored in the hard disk of the tester 30a, copied to the floppy disk and input to the repairer 30b. The system also renders unnecessary delays when the floppy disk has an error. Also, since an operator manually exchanges the job result data, the conventional system may not work properly.

To resolve the above described problems, instead of a floppy disk, another conventional system uses a serial communication cable such as RS-232C to connect the tester and the repairer, and the job result data are transferred from the tester to the repairer through the cable.

However, since RS-232C is for a one-to-one communication, the tester can only share the data with the repairer connected by a cable. Hence, the conventional system using cables cannot cope with a system that a plurality of machines have to share with others the job result data executed in one machine. For this reason, an operator cannot but move the floppy disk directly from one machine to the other machines. Furthermore, the communication using RS-232C is slow and it takes too much time when transmitting a large amount of job result data.

SUMMARY OF THE INVENTION

An object of the present invention is to overcome the above-described problem. Another object of the present invention is to connect all machines to a file server by a network, sharing the job result data with all machines, automatically supplying the job result data to all machines.

BRIEF DESCRIPTION OF THE DRAWINGS

Further objects and advantages of the invention will be apparent from the following detailed description in conjunction with the accompanying drawings.

DETAILED DESCRIPTION OF THE PREFERRED EMBODIMENTS

Figure 1:
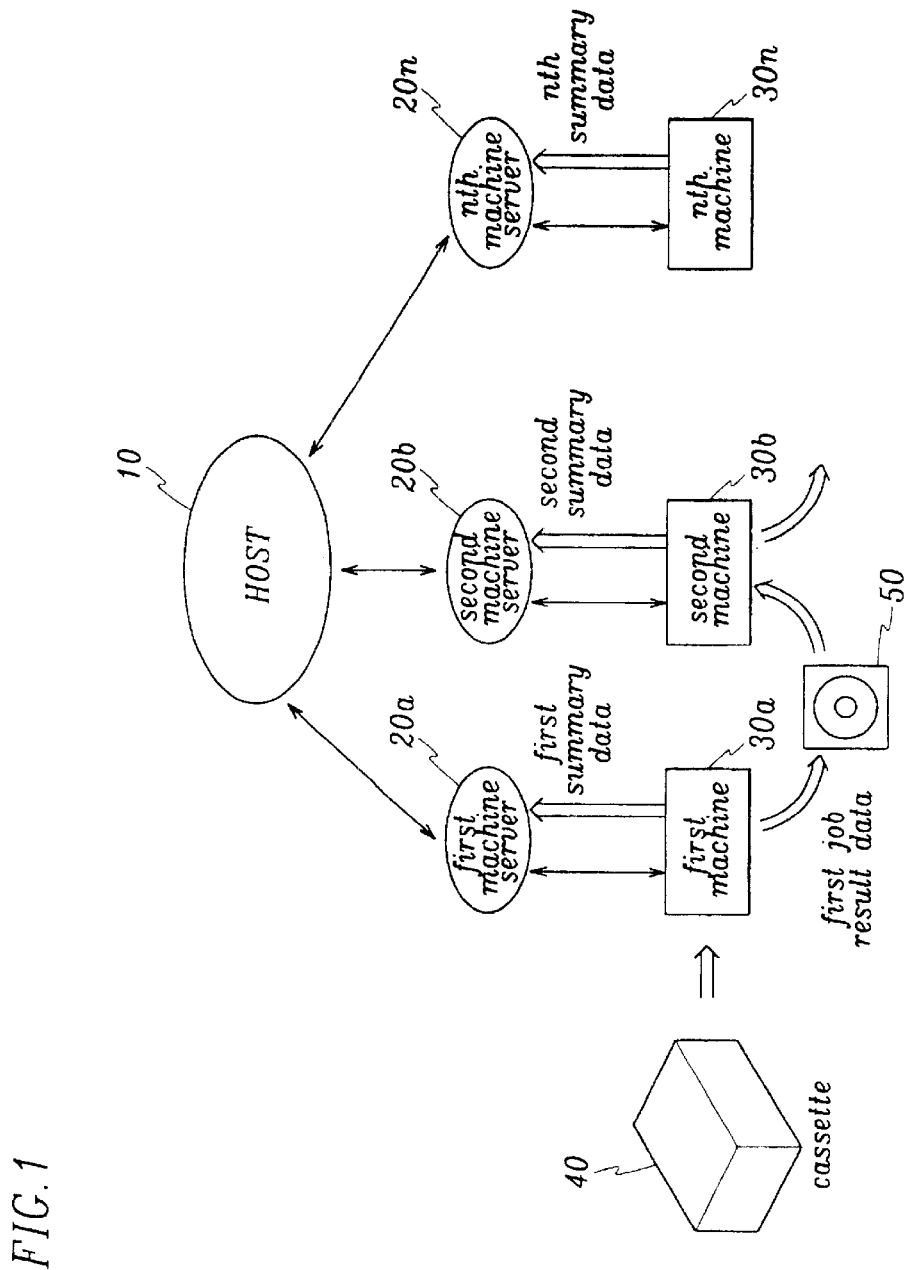
FIG. 1 is a block diagram showing a configuration of a conventional system.

To achieve the above described objects, the present invention provides a file server connected to a plurality of machines by a network, storing job result data of the machines to allow the machines to share the job result data such that a machine may use a job result data processed by a previous machine.

An automation system in accordance with an aspect of the present invention has a plurality of machines, each executing a job on a work piece, at least one file server connected to the machines by a network and storing a job result data on jobs executed by the machines such that the machines may share the job result data, plurality of machine servers respectively connected to the machines and controlling the machine connected thereto, and a host connected to the machine server by the network, having job information required for the machines and providing the job information to the machine servers.

Each machine can share the job result data of the machines stored in the file server and accordingly may start to operate by using the job result data of the previous machine.

Furthermore, the automation system further comprises an AGV transferring work subjects to each machine. An AGV controller receiving commands from the host controls the AGV.

The automation system connects the file server and further comprises a user interface that allows a user to directly access the job result data stored in the file server.

Meanwhile, an automation system for micro electronic devices, another embodiment of the present invention, comprises a plurality of machines including a tester for testing a substrate, at least one file server connected to the machines by network, the file servers storing job result data of each machine and sharing them with the machines, a plurality of machine servers each controlling one of the machines respectively, a host connected to the machine servers by network and providing a job information needed in the corresponding machine. The host has a self-contained database, retrieves the database based on the key of the substrate identifier fixed in the substrate and obtains the job information needed for the machine.

The plurality of machines further comprises a repairer for repairing the substrate corresponding to the job result data from the tester. At this time, the tester tests the substrates and stores test result data in the file server. The repairer reads the test result data from the file server, uses them for a repair work and stores repair result data in the file server.

The automation system further comprises a viewer that uses the test result data stored in the file server. The viewer automatically moves to an error location based on is the test result data and an operator examines it.

The automation system of the micro electronic device further comprises a user interface that enables a user to use the job result data stored in the file server directly and an AGV controlled by the host and moving the substrates to each machine automatically.

Meanwhile, a method for controlling an automation system in accordance with an embodiment of the present invention comprises the steps of recognizing a work piece loaded in a first machine, receiving a job command on the job in the first machine from a controller, reading the job result data of a previous machine needed in the first machine from the file server that stores the job result data executed in a plurality of machines, executing the job in the first machine utilizing the job result data of the previous machine, and storing the job result data of the first machine in the file server.

Here, the file server is connected on-line to a plurality of machines including the first machine.

A method for controlling an automation system in accordance with another embodiment of the present invention comprises the steps of loading a substrate in a first machine, processing the substrate in the first machine and storing a first job result data in a file server, unloading the substrate from the first machine, moving the substrate to a second machine and loading it there, reading the first job result data from the file server before starting operation of the second machine, processing the substrate by utilizing the first job result data while storing a second job result data in the file server after an operation, and unloading the substrate from the second machine.

The system in accordance with embodiments of the present invention is described referring to the drawings. An automation system used in the TFT-LCD assembly line is described as an example.

Figure 2:
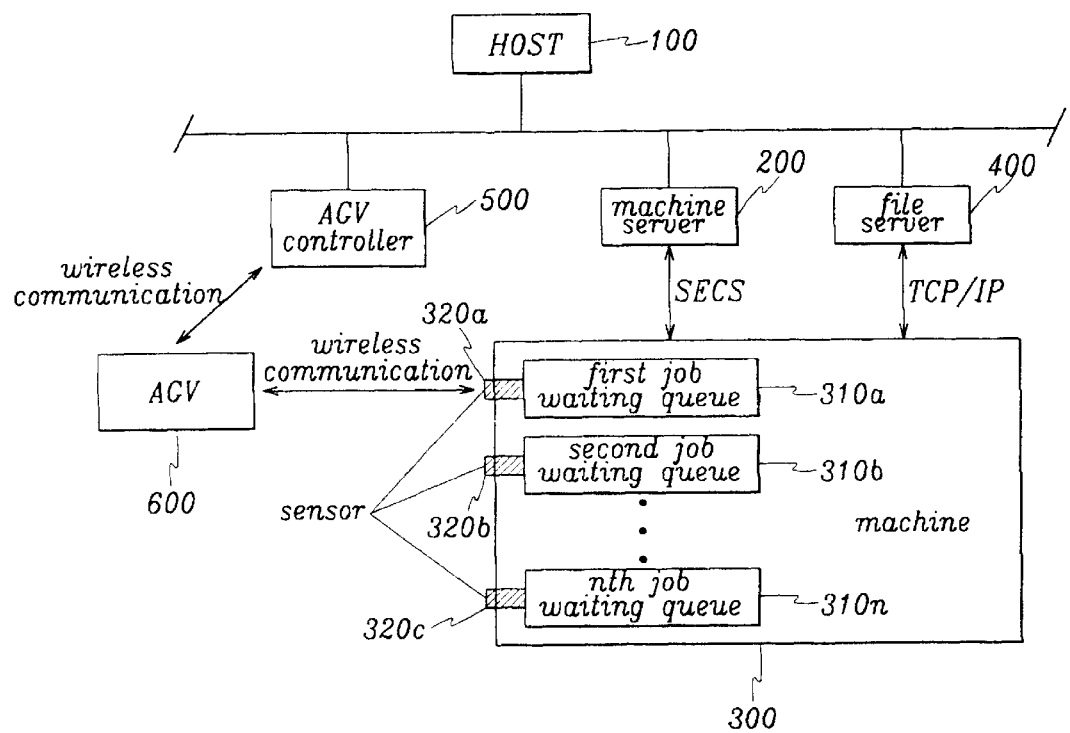
FIG. 2 is a block diagram showing a communication structure of an automation system in accordance with the embodiment of the present invention.

FIG. 2 shows a communication structure of the automation system in accordance with the embodiments of the present invention.

As shown in FIG. 2, a host 100 is connected to a machine server 200, a file server 400 and an AGV controller 500 through a network using TCP/IP. The host 100 exchanges information with them or sends control commands in a predetermined message format.

If the AGV controller 500 receives commands from the host 100, it communicates with the AGV 600 via wireless communications and sends a special command. Corresponding to the command from the AGV controller 500, the AGV 600 loads a cassette and moves it to the machine 300. The AGV 600 automatically loads a processed cassette from the machine and transfers it to a next machine. When completed, the AGV 600 outputs a message that the job is completed to the AGV controller 500 via wireless communications. At this time, the AGV controller 500 retransmits the corresponding message to the host 100 via the network. The host 100 controls the AGV 600 in this manner.

The machine 300 is connected to the machine server 200 through a one-to-one communication method, a semiconductor equipment communication standard(SECS), and is connected to the file server 400 by a TCP/IP network. The machine 300 has a plurality of job waiting queues 310a~310n and each job waiting queue of 310a~310n uses one port of the machine 300.

If the AGV 600 transfers the cassette to the first job waiting queue 310a, a first port that the first job waiting queue 310a uses, produces an event, that is, that the cassette is loaded in the first job waiting queue. After that, the machine 300 receives the event and transmits a message for requesting a job on the cassette transferred to the first job waiting queue 310a. In this manner, if the cassette moves to the job waiting queue 310a~310n, each port in the machine 300 produces the event that the port is used. Further, if the cassette is removed from the job waiting queue 310a~310n, each port produces the event that the port is empty.

Figure 3:
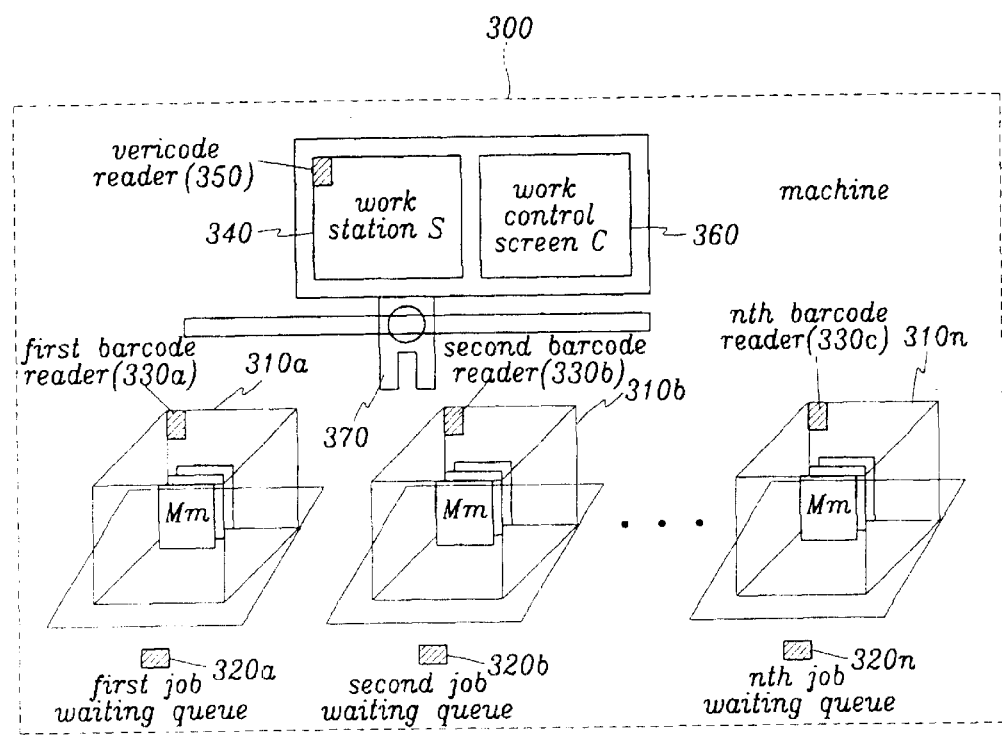
FIG. 3 is a view of a machine used in an embodiment of the present invention.

FIG. 3 shows the machines of FIG. 2 in detail.

As shown in FIG. 3, the machine 300 has a work station 340 performing an actual work and a work control screen 360 that allows an operator to see work subjects directly and to work on them. The work station 340 is equipped with a vericode reader (VCR) for reading a glass identifier ("glass ID") stored in a cassette. Furthermore, each of a plurality of job waiting queues 310a~310n of the machine 300, respectively, include sensors 320a~320n used in wireless communication with the AGV and bar code card readers 330a~330n for reading the cassette identifier("cassette ID") if the cassette moves to the job waiting queue.

The glass stored in the cassette is moved and processed individually or as a group of n glasses ("lot"). A moving robot 370 transfers a glass or a lot of glasses from the cassette to the work station 340. The VCR 350 in the work station 340 reads the glass ID or lot ID and displays the information of the glass or the lot in the work control screen 360.

Figure 4:
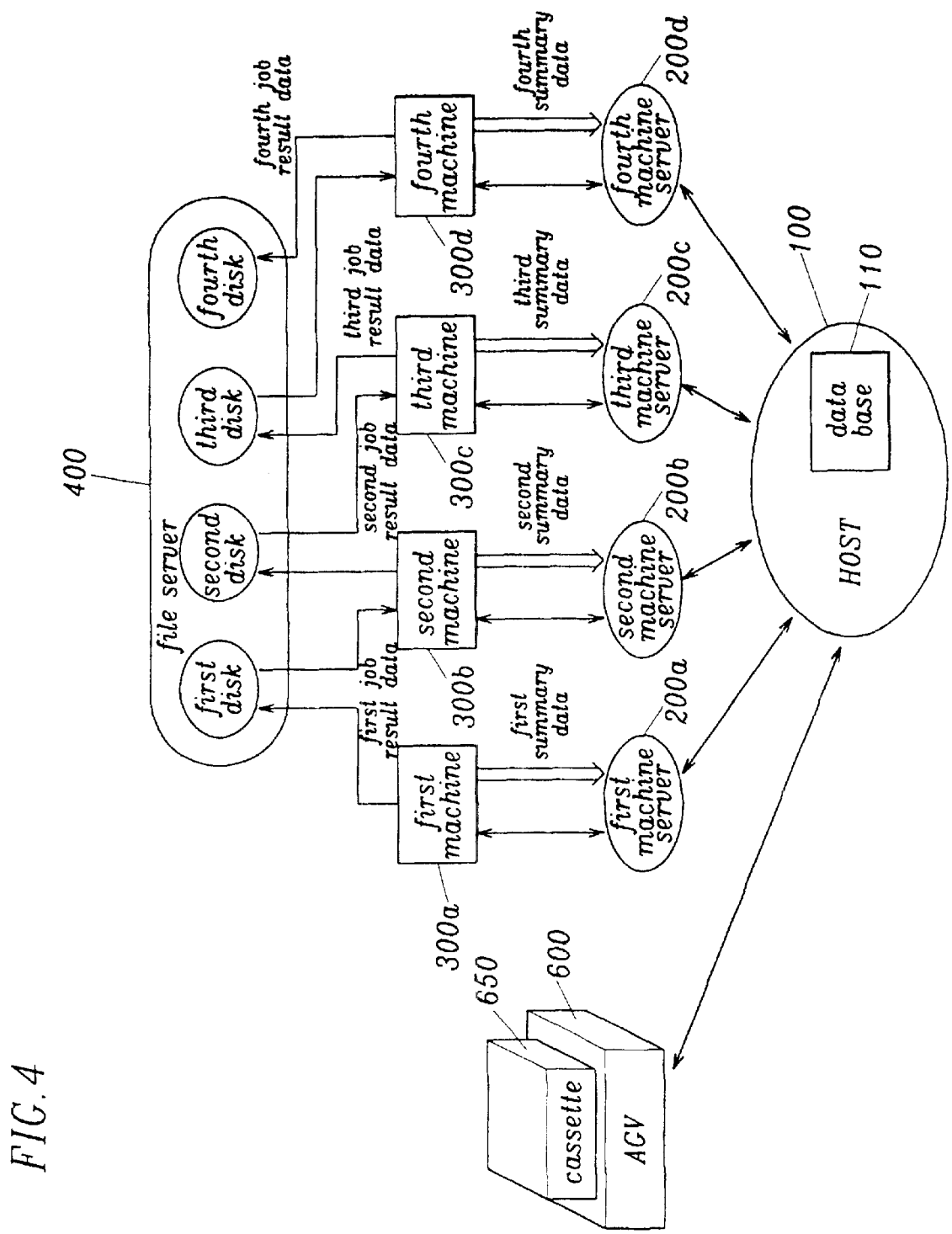
FIG. 4 is a schematic diagram showing a configuration of an automation system in accordance with a first embodiment of the present invention.

Next, the structure of the automation system in accordance with an embodiment of the present invention is described. FIG. 4 is a schematic diagram of the automation system in accordance with a first embodiment of the present invention.

As shown in FIG. 4, the automation system includes a plurality of machines 300a~300d, a plurality of machine servers 200a~200d connected to the plurality of machine 300a~300d respectively, a file server 400 storing job result data of the plurality of machine and a host 100 connected to the plurality of machine servers.

In FIG. 4, the host 100 having a database 110 in itself, retrieves relevant information from the database 110 based on the key of the cassette ID and the glass ID (or the lot ID) and performs the job. Then, the host 100 sends a predetermined message to the machine servers 200a~200d. Furthermore, the host 100 sends a signal to the AGV 600 and transfers the cassette 650 to the machines 300a~300d automatically according to a predetermined procedure. If the host 100 commands the AGV controller to move the AGV, for example, to the machine 300a, the AGV controller sends a control signal to the AGV via wireless transmission.

The machine servers 200a~200d receive the messages on the cassette 650 and its glass or lot and control the machines 300a~300d according to the messages.

Hereinafter, let it be assumed that a first machine 300a is a tester and a second machine 300b is a repairer. These machines are used to explain how a first job result, e.g., a test result data of the first machine is used in the second machine 300b.

First, the host 100 controls the AGV 600 and moves the cassette to the tester 300a. If the cassette having a plurality of glasses moves to the tester 300a, the tester server 200a controls the tester according to the message from the host 100.

The tester examines if any glasses stored in the cassette 650 have errors such as a short circuit or an open circuit on data lines and transmits the test result data to the file server 400. At this time, the test result data are stored as raw data. The raw data are coordinate data of defects, image data of defects, defect contents such as a short circuit or an open circuit, and the like. Furthermore, the tester 300a transmits the summary data, which is processed from the result data of the tester, to the tester server 200a through one-to-one communication. For example, the summary data can be a number of defective glasses, etc.

According to the first embodiment of the present invention, since the tester 300a transmits a large amount of raw data to the file server 400, the tester 300a is connected to the file server 400 by a TCP/IP protocol. Furthermore, since the amount of the summary data transmitted from the tester 300a to the tester server 200a is smaller, the tester 300a is connected to the tester server 200a via SECS (semiconductor equipment communication standard).

If the tester 300a finishes testing the glasses in the cassette 650, the host 100 controls the AGV 600 to transfer the cassette 650 to the repairer 300b. When the cassette 650 moves to the repairer 300b, the repairer 300b reads the raw data on the cassette 650 (specifically the glasses stored in the cassette) processed in the previous step from the file server 400. At this time, the repairer 300b searches the file server 400 on the key of the cassette ID and retrieves the test result data on the cassette from the file server 400.

The repairer 300b utilizes the test result data on the cassette and repairs the glasses stored in the cassette. Similarly, the repairer server 200b receives messages from the host 100 and controls the repairer 300b.

If the repairer 300b completes repairing, the file server stores the large amount of raw data (for instance, coordinate data of repair and contents of repairs) and the summary data (for example the number of repaired glasses) are transmitted to the repairer server 200b.

In accordance with the first embodiment, since the file server 400 has the test result data (the raw data) from the tester 300a, the repairer 300b repairs glasses by sharing the test result data.

However, in the first embodiment, the transmission of summary data from the tester 300a and the repairer 300b to the tester server 200a and the repairer server 200b without storing them in the file server causes the following problem. If the summary data from the tester 300a and the repairer 300b are not transmitted to the tester server 200a and the repairer server 200b due to communication errors or for other reasons, there is no way to recover the summary data.

A second embodiment of the present invention is designed to overcome such a problem.

Figure 5:
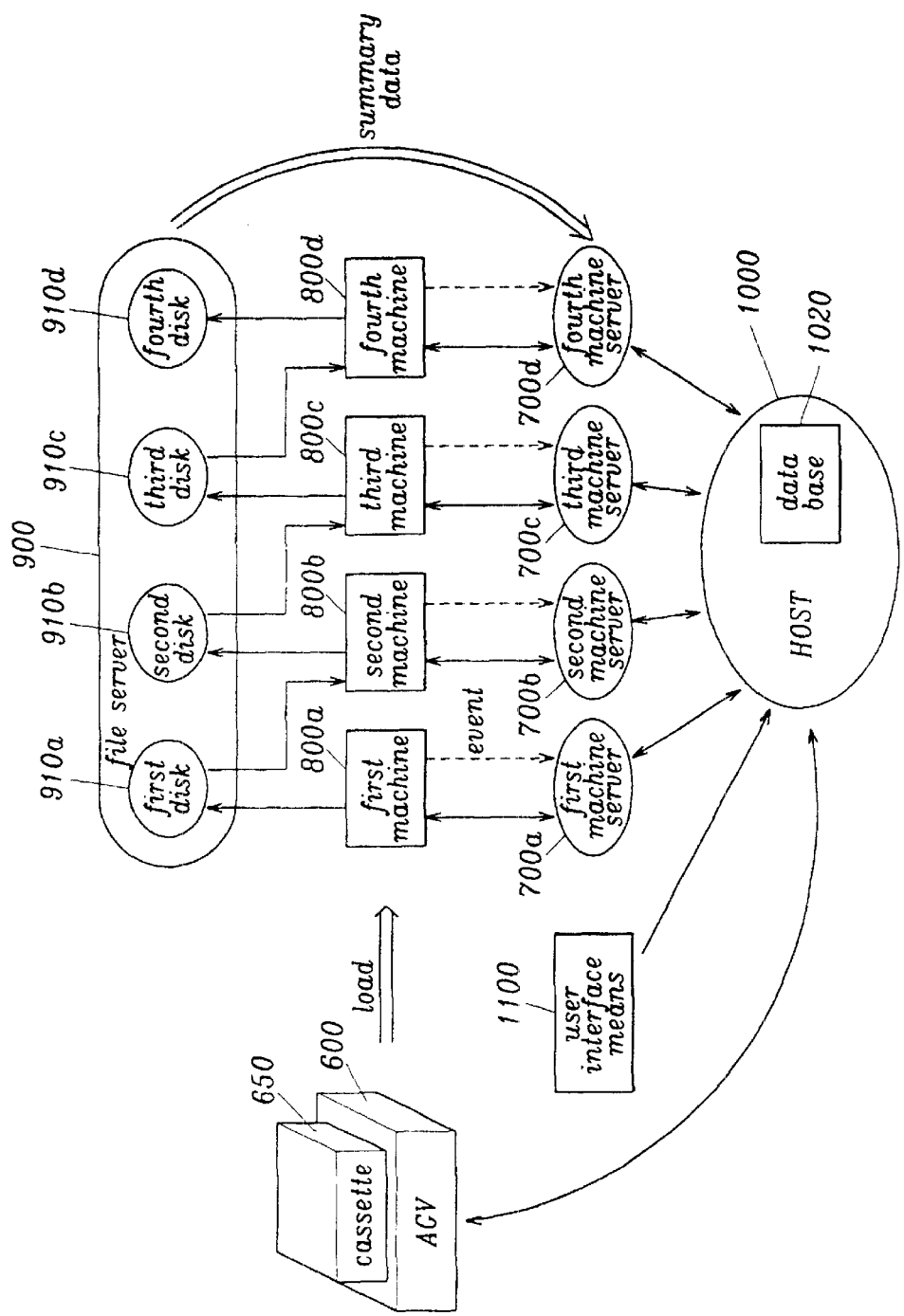
FIG. 5 is a schematic diagram showing a configuration of an automation system in accordance with a second embodiment of the present invention.

FIG. 5 shows a schematic diagram of an automation system in accordance with the second embodiment.

As shown in FIG. 5, the automation system in accordance with the second embodiment of the present invention comprises a plurality of machines 800a~800d, a plurality of machine servers 700a~700d each respectively connected to one of the machines, a file server 900 storing job result data from the plurality of machines, a user interface 1100 connected to a host 1000 for interfacing with a user.

In FIG. 5, the job result data stored in the file server 900 include not only raw data but also summary data. In the second embodiment of the present invention, if the plurality of machines 800a~800d complete the job, contrary to the first embodiment, the summary data are stored with the raw data in the file server 900, and the machine servers receive an event showing that the data are stored in the file server, that is, the job is completed. Next, the machine servers 700a~700d connect to the file server 900 and retrieves the summary data directly.

Therefore, even if the data transmission from the machine to the machine server are interrupted due to communication errors, the summary data can be transmitted as described below because the summary data had already been stored in the file server.

If the machine does not send an event signal to the machine server, a user may access the host and generate the event signal to send to the machine server. Through the user interface 1100 connected to the host, the user creates a virtual event (event2), which makes the machine server connect to the file server and bring the necessary summary data.

Figure 6:
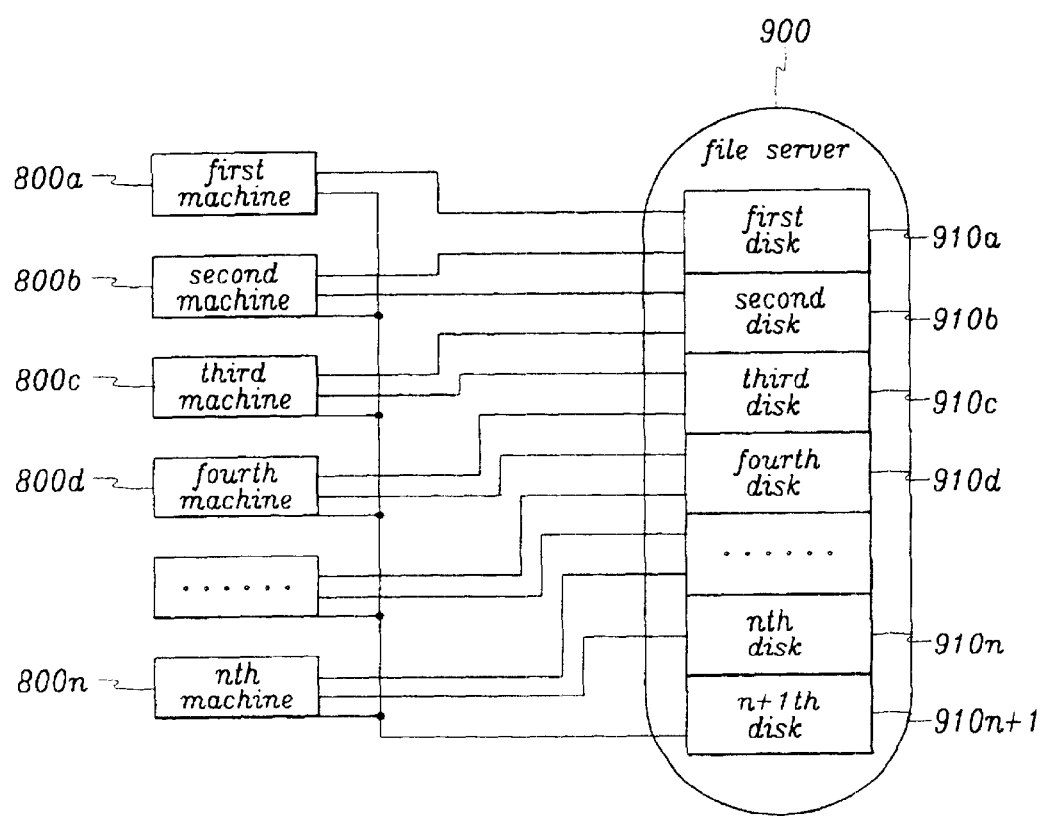
FIG. 6 is a detailed schematic diagram showing a configuration of a file server in FIG. 5.

FIG. 6 is a detailed view of the file server in FIG. 5.

As shown in FIG. 6, each machine 800a~800n is connected to each disk 910a~910n in the file server and the plurality of machines 800a~800n are commonly connected to a common disk (910n+1).

As described above, the job result data from each machine consist of the unprocessed raw data and the summary data processed for statistical information.

Since the raw data are huge, a disk allocated for each machine stores them. Since the summary data are not huge, a common disk 910n+1 for all machines stores them. A type of raw data, such as the defect image data from the repairer, which is very large, may be stored in a specially allocated additional disk.

The disk in the file server may build a directory using a machine name for easy data search. For example, if the first machine 700a uses the first hard disk 910a in the file server, the directory is named as "/disk1/eqpid_1". If the first machine 800a uses the n+1th hard disk, the directory is named as "/disk1/eqpid_1".

Therefore, the raw data of the first machine are stored in the "/disk1/eqpid_1" directory and the summary data of the first machine are stored in the "/diskn+1/eqpid_1" directory.

Hereinafter, in accordance with the embodiments of the present invention, the method for controlling the automation system will be described.

Figure 7:
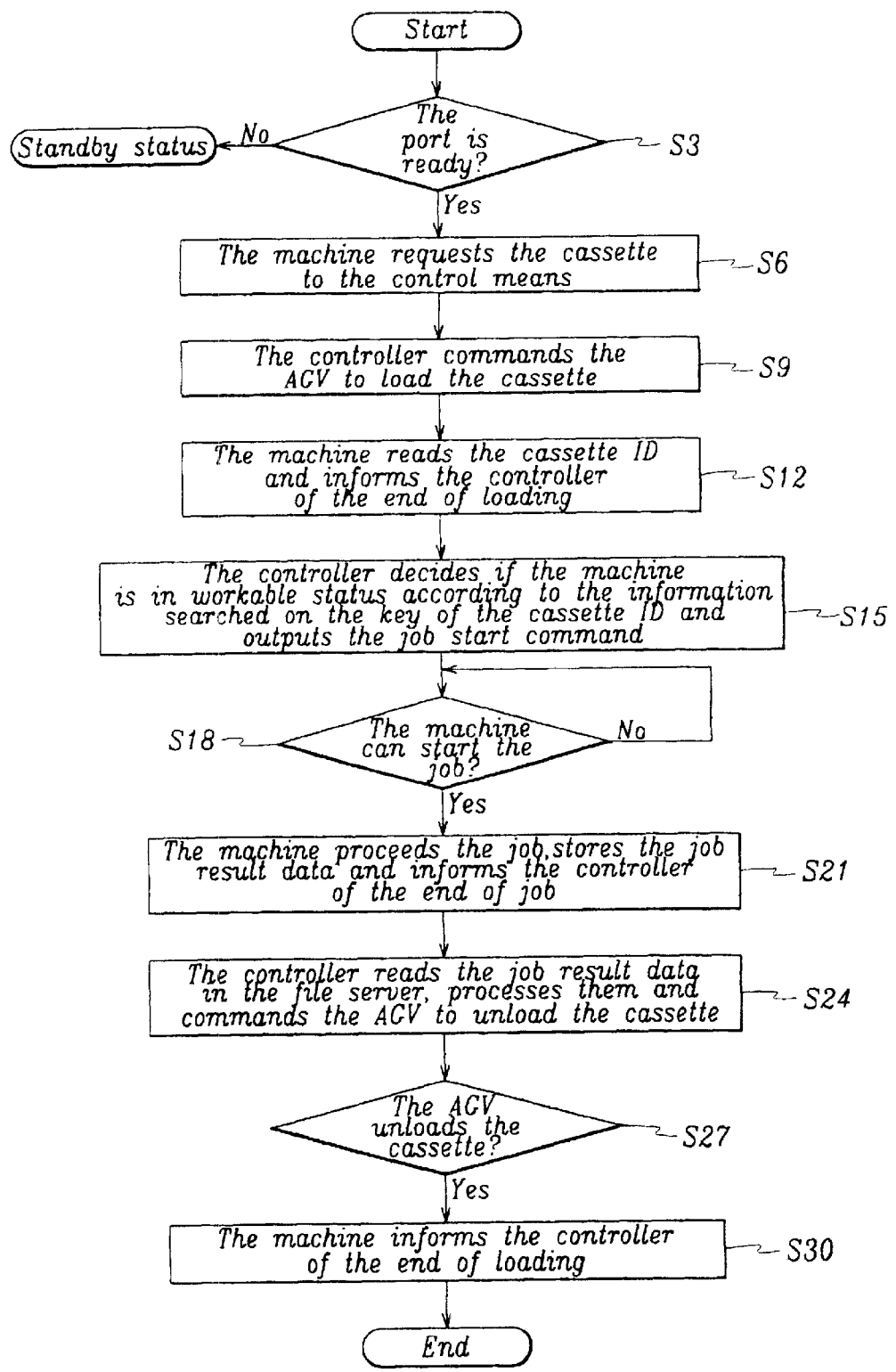
FIG. 7 is a rough flowchart representing a control method of an automation system in accordance with embodiments of the present invention.
Figure 8A:
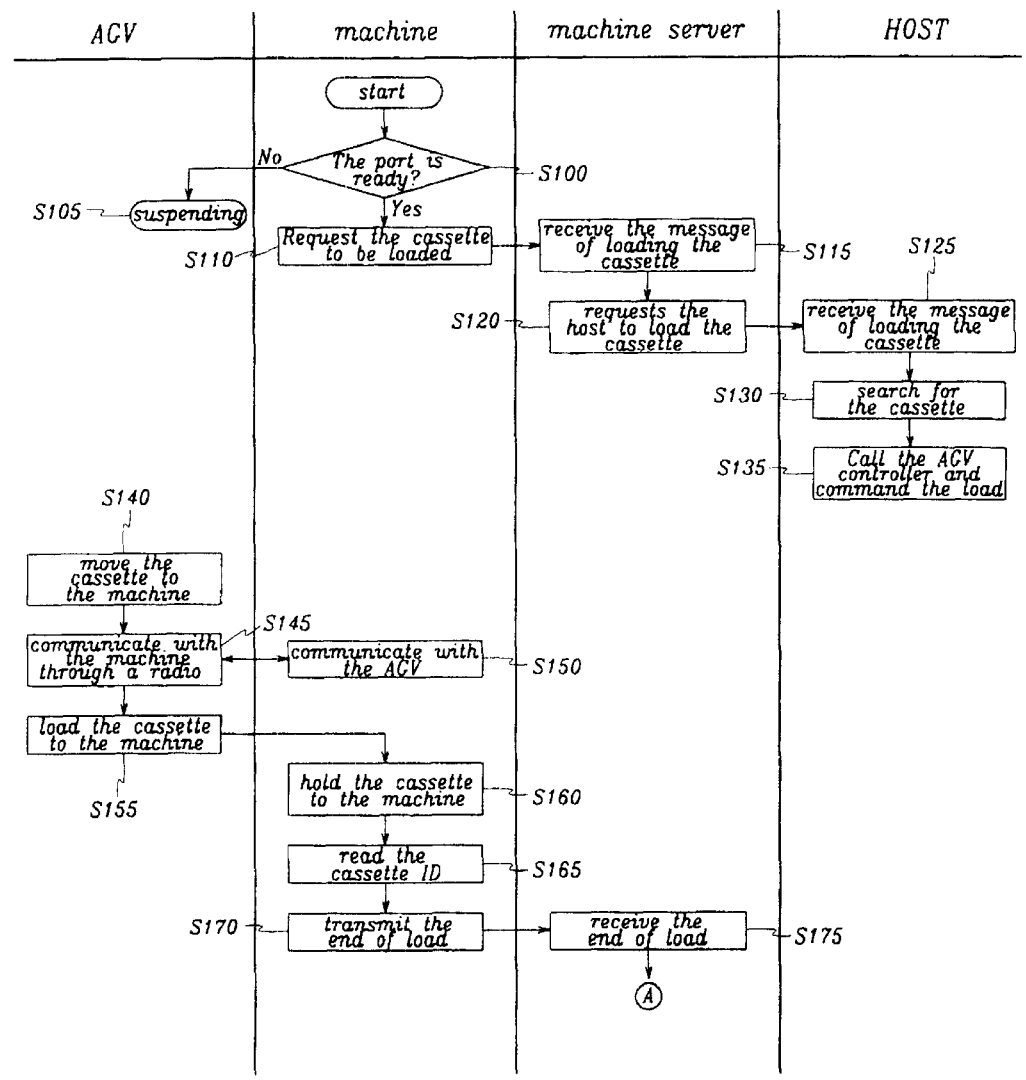
FIGS. 8A~8E are detailed flowchart showing a control method of an automation system in accordance with embodiments of the present invention.
Figure 8B:
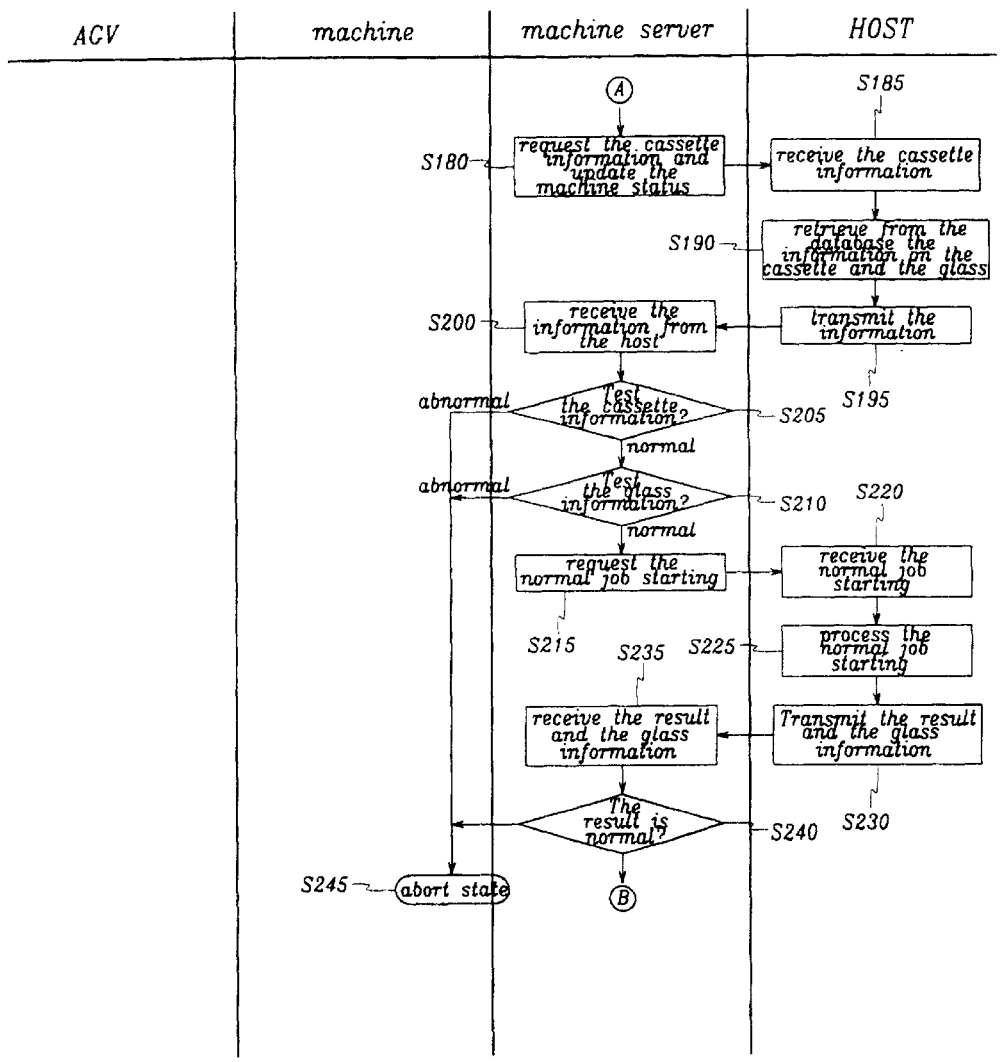
Figure 8C:
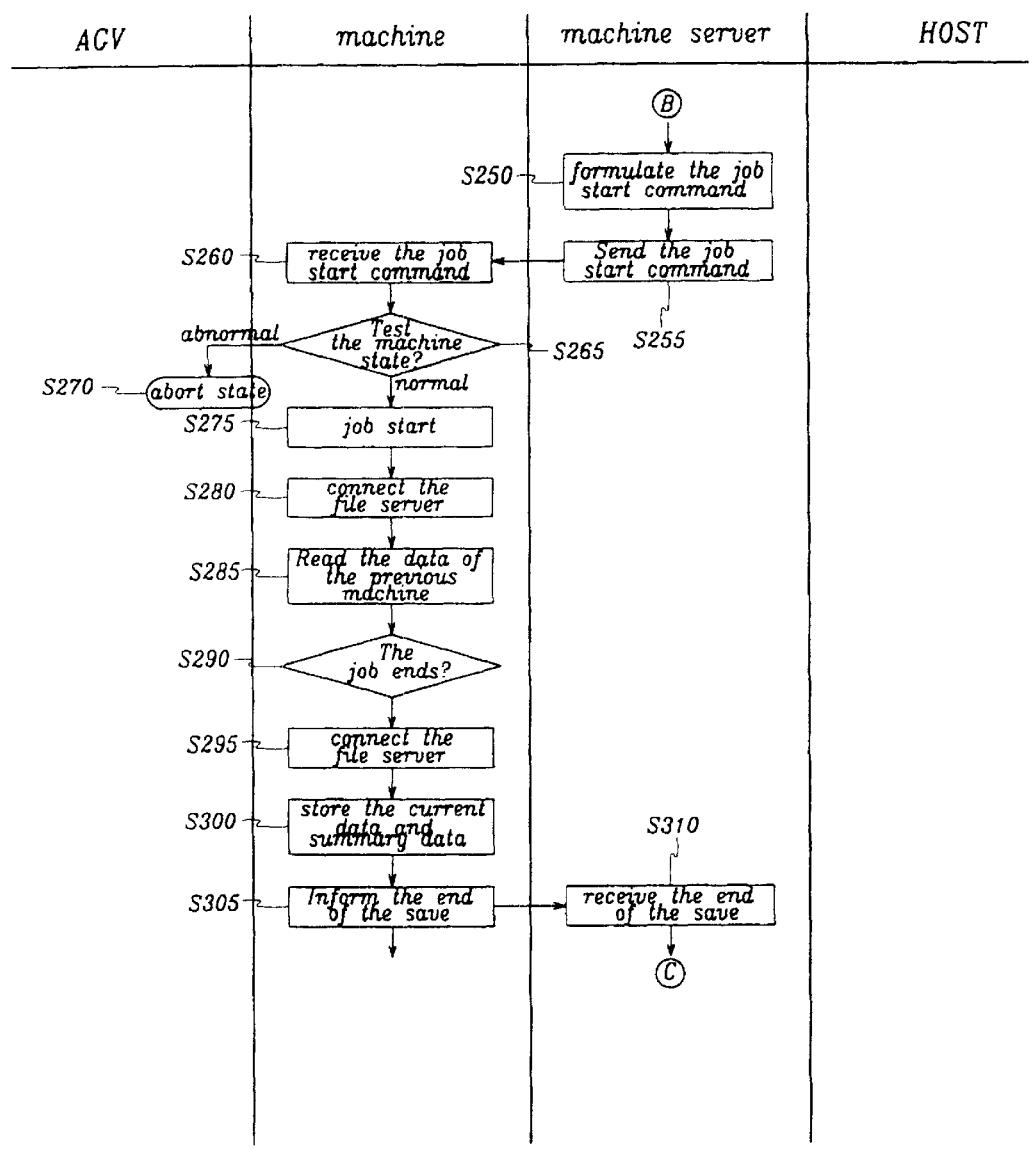
Figure 8D:
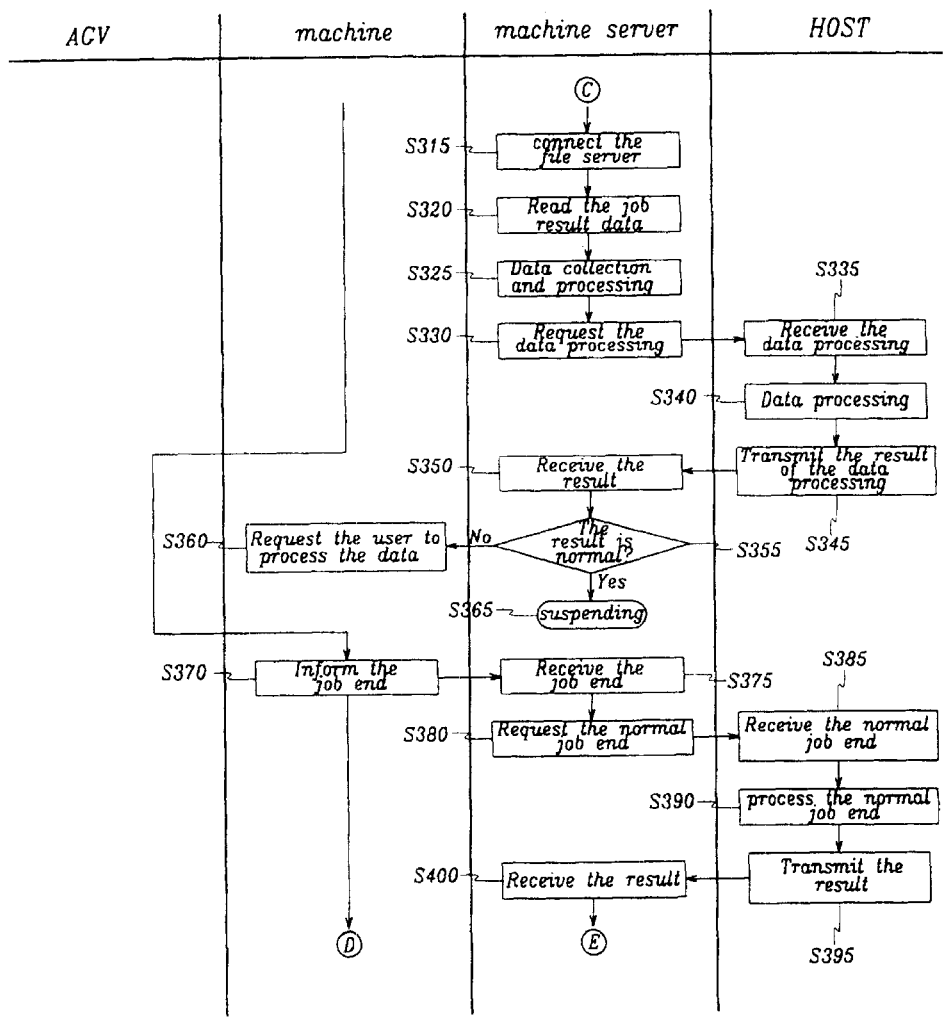
Figure 8E:
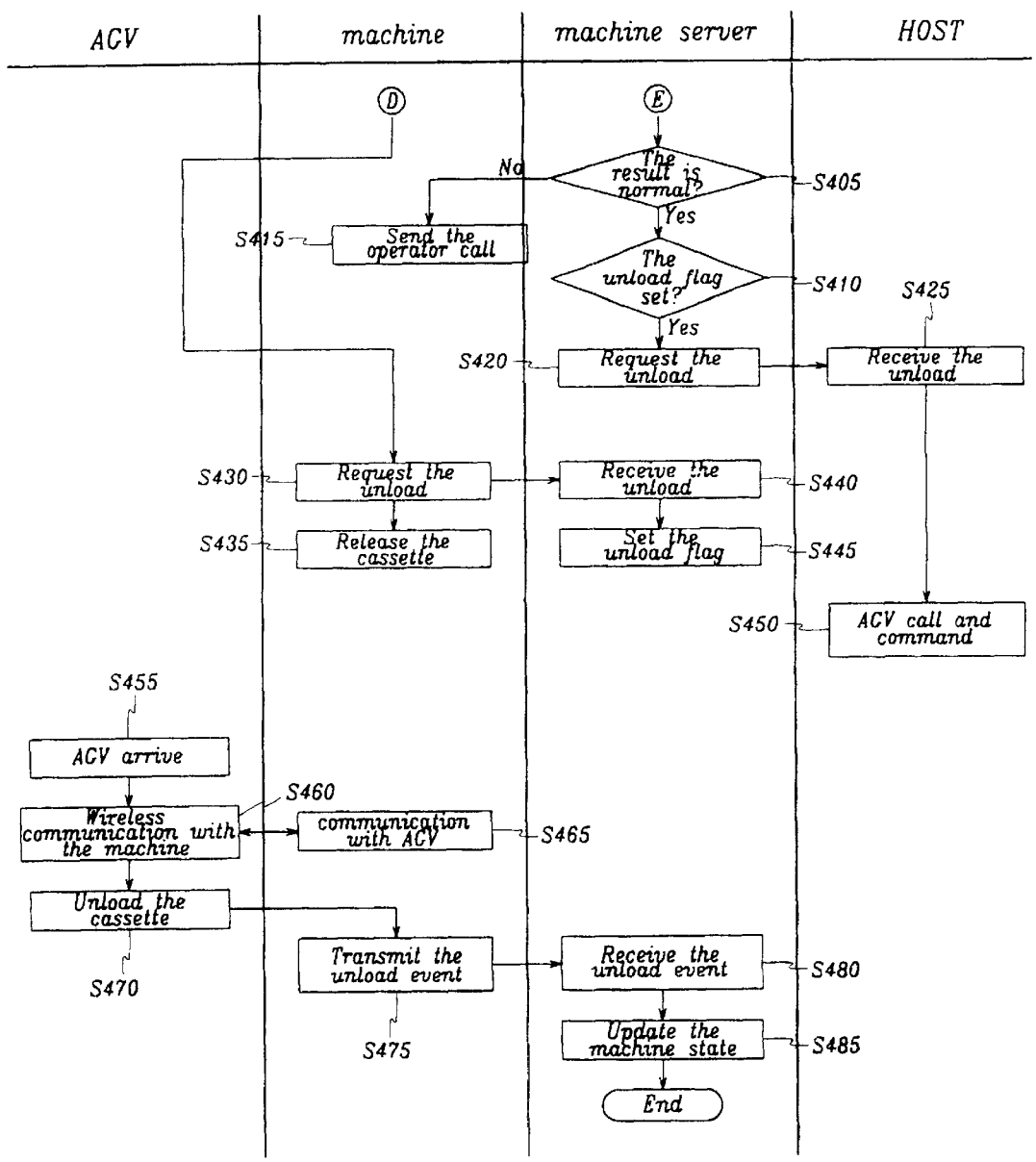

FIG. 7 is a flowchart showing a method of controlling the automation system in accordance with an embodiment of the present invention. For convenience, the machine servers and the host of FIGS. 2~5 are referenced as controller in FIG. 7. Hereinafter, assuming that the first machine is the tester and the second machine is the repairer, the test and repair process will be described.

The tester determines if a first port corresponding to the first job waiting queue of the tester is ready(S3). If the first port is ready, the tester sends a cassette request message to the controller (S6).

The controller searches its database to find the cassette ID that is to be processed in the tester, and commands the AGV to load the cassette to the tester(S9).

The AGV picks up the cassette from the stocker and transfers it to the job waiting queue of the tester.

The bar code reader in the first job waiting queue of the tester reads the cassette ID and sends a message informing the controller of the loading. This message includes the cassette ID.

The controller checks if the tester is ready according to an information retrieved by the cassette ID. If the tester is ready, the controller sends a job start command to the tester (S15). At the same time, any information necessary for the tester to do the job transmits together with the job start command.

The tester starts the job instantly if there is no current job. If there is a current job, it starts a new job after the current job is finished (S18). The tester tests each glass in the cassette and stores the raw data (or the summary data) to the file server. The tester may store in the file server each of the test result data one by one after it finishes testing each glass, or it may store all the test result data at once after testing all the glasses. Once all the test result data are stored, the tester informs the controller of the end of job (S21).

Hence, the controller reads the raw data stored in the file server by the tester and accordingly processes them in various methods for image data or statistic data. After this, the controller commands the AGV to unload the cassette (S24).

The AGV unloads the finished cassette from the tester. If the AGV completes unloading of the cassette, the tester informs the controller.

The controller keeps a record that the tester job on the cassette is finished. Since the cassette be processed in the repairer in the next process, the controller searches the database and retrieves a plurality of port information. If there is an empty port (that is, a job waiting queue) currently available for the repairer, the controller commands the AGV to transfer the cassette to the job waiting queue of the repairer.

The AGV loads the cassette in the job waiting queue of the repairer and the repairer receives a command from the controller and operates according to it, like the tester. The repairer reads the raw data (for example, coordinate data of defects, defect contents) that the tester stored in the file server and repairs defective glasses in the cassette. If the repairing is complete, the repairer stores the raw data (for instance, coordinate data on repairs, repair contents) or the summary data to the file server.

Hereinafter, the controller described above consists of the machine server and the host. Their roles and message communication methods are described in detail.

The machine server has a program for controlling the machine directly. Whenever the special event occurs in the machine, the machine server operates in an event-driven method, which operates according to the event. Furthermore, the machine server sends to the host a message coming from the machine including the cassette ID in a predetermined format. The host searches the database for a job information on the cassette and sends it to the machine server in a predetermined message format. The machine server generates a command by processing the information in this message and passes the command to the machine again. Since the machine server is connected to the file server, it can read the data from the file server or store the data to the file server whenever necessary.

The most important role of the machine server is to connect the file server, read the data, process them and transmit them to the host if the machine server receives the job end message, and to remotely control the machines if it receives the special information from the host.

The host operates as follows. First, the host manages the flow of glasses(or lots) and the cassette and schedules to process glasses or the lot. Second, it controls the AGV and moves the cassette having the glasses between the machines, the job waiting queues and the stocker. Third, it manages the machines for the whole assembly line, including the control of a plurality of ports and the job result data. Therefore, the host has its own database for these roles.

Figure 9:
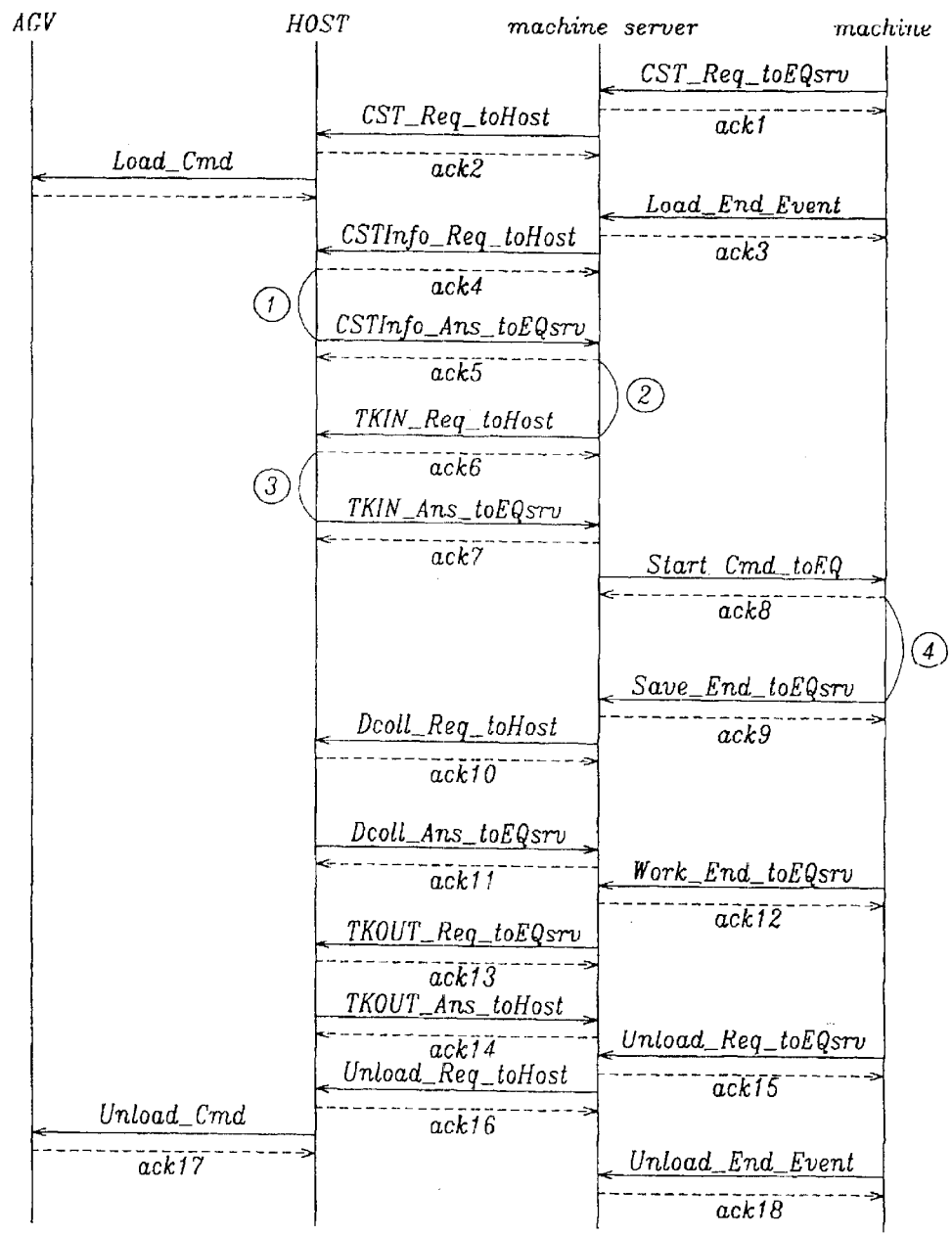
FIG. 9 is a message flowchart used in a control method of an automation system in accordance with embodiments of the present invention.

FIGS. 8A–8E is a detailed flowchart showing the method for controlling the automated system in accordance with the embodiments of the present invention. FIG. 9 is a message flowchart used in the method for controlling the automation system in accordance with the embodiments of the present invention.

Hereinafter, the assembly lines of the tester and the repairer are taken as an example.

The tester checks if the port (the job waiting queue) is available(S100). If the port becomes available, the tester sends the tester server a CST_Req_toEQsrv message that requests the tester server to load the cassette (S110).

If the tester server receives the CST_Req_toEQsrv message(S115), it transmits to the host a CST_Req_toHost requesting the host to load the cassette (S120). If the host receives the CST_Req_toHost message (S125), it searches its database for information on the cassette containing glasses to be processed in the tester. After this, the host outputs a load command Load-Cmd to the AGV controller to move the cassette to the machine(S135).

The AGV controller instructs the AGV to move the cassette to the tester (S140).

At this time, the AGV communicates with the tester via wireless communications (S145,S150) and loads the cassette to the job waiting queue of the tester(S155).

Once the cassette is loaded, the sensor of the job waiting queue detects the cassette and secures it (S160). The bar code reader reads the cassette ID (S165). After loading the cassette, the tester transmits to the tester server a Load_End_Event message with the cassette ID indicating that the loading events has finished (S170).

If the tester server receives the Load_End_Event message (S175), it sends to the host a CSTInfo_Req_toHost message requesting information on the cassette, and updates the machine status and the port information in the database of the host (S180).

Actually, the updating can be processed directly by the tester server through the network or by the host that receives the update request message. That is, since the machine server is connected to the host, both the machine server and the host may access the database in the host. The system designer may choose which has an access privilege to the database.

If the host receives the CSTInfo_Req_toHost message, it retrieves from the database the information on the cassette using the cassette ID in the message (S190). When retrieved, the host formats the information in a CSTInfo_Ans_ toEQsrv message and transmits it to the tester server(S195). This CSTInfo_Ans_toEQsrv message includes informations such as a current cassette information, a glass information and a lot information stored in the cassette, a job contents, a job process, a location of the glass and the lot in the cassette, a job recipe, quantities, and so on.

Receiving the CSTInfo_Ans_toEQsrv message(S200), the tester server checks its availability. That is, the tester server obtains the information on the cassette from the CSTInfo_Ans_toEQsrv message and checks if this cassette can be processed in the tester (S205). If the cassette is in a normal state, the tester server gets the information on glasses or the lot and examines if the information is correct (S210). Since the cassette information that the tester server receives includes the pure information on the cassette, the information on glasses or the lot in the cassette and job contents, the tester server synthesize the information and determines the tester status. At this time, if the tester is abnormal, the tester server aborts its operations(S245) and if normal, it sends to the host a TKIN_Req_toHost message requesting the host to initiate the commencement of the job (S215).

Receiving a normal TKIN_Req_toHost message (S220), the host verifies the information again as the tester server did.

Double verifications in both the machine server and the host are for safety purposes. In practice, the system designer may design just one verification job either in the machine server or in the host.

When verified as normal, the host records the job starting in the database (S225, 3) and sends the tester server a TKIN_Ans_toEQsrv message answering the TKIN_Req_toHost message (S230).

Receiving the TKIN_Ans_toEQsrv message (S235), the tester server checks if the verification result from the host is normal (S240). If abnormal, it goes to the abort state. If normal, it synthesizes the information received from the host up to now and formulates a command for the tester (S250). Then, the tester server sends the tester a Start_Cmd_toEQ command (S255). This Start_Cmd_toEQ command includes a detailed information on how the tester works. The Start_Cmd_toEQ command includes the job recipe sent by the host and is transmitted to the tester. The job recipe has information on the location of the file server having the job result data processed in the previous job, an information for storing the result data in the file server after finishing the job, the glass information for each job process, a basic condition in the tester, a parameter set, etc.

The tester receiving the Start_Cmd_toEQ command (S260) checks the command for all the information necessary for the job (S265). If the information is deficient or the tester is abnormal, it goes to the abort state (S270). If the tester is normal, it starts the job as soon as it receives the command and if it has a current job, it waits until the current job finishes and then starts the new job.

The tester combines the job recipe, the glass ID or the lot ID and consequently connects to the file server (S280), to read the previous the job result data using the cassette ID (actually the cassette ID, the lot ID and the glass ID are linked together). Then, it tests the glasses in the cassette (S285, 4). Completing the test of glasses, the tester combines the current job recipe and the glass or the lot ID, sends to the file server again to store raw data (coordinate data of defects, defect contents) on each glass or summary data (the number of error glasses) at the predetermined location of the file server (S300).

Finishing jobs for all the glasses, the tester sends the tester server a Save_End_toEQsrv message indicating the end of saving (S305). If the tester server receives the Save_End_toEQsrv message, it connects to the file server (S315) and reads the job result data(mostly summary data) (S320). Here, the job result data includes a glass ID, a machine ID, a process ID, a job start time, a job end time, an information on the glass defects or data on the process. Using the job result data, the tester relocates the glass (or lot) in the cassette, reprocesses the glass and collects the data for analysis (S325).

Then, the tester server sends to the host a Dcoll_req_toHost message requesting these data to be processed (S330).

Receiving the message (S335), the host processes the data (S340) and transmits a Dcoll_Ans_toEQsrv message answering the Dcoll_req_toHost message to the tester server (S345).

If the tester server receives the message (S350), it examines if the data were processed normally (S355). If abnormal, the tester server waits until the user inputs necessary data through the user interface connected to the host (S360).

If the tester server finishes all the jobs, the tester sends a Work_End_toEQsrv message informing that the work is over (S370). The Work_End_toEQsrv message can be sent prior to the Save_End_toEQsrv message described above (S370).

If the tester server receives the Work_End_toEQsrv message (S375), it transmits a normal TKOUT_Req_toHost message indicating that the job is complete (S380).

The host receives the TKOUT_Reqa_toHost message and processes to end the job (S390) and transmits a normal TKOUT_Ans_toHost message answering the TKOUT_Req_toHost message to the tester server (S395).

The tester server that received the TKOUT_Ans_toHost message (S400) determines if the host had processed the end of job normally (S405) and alerts an operator if not normal (S415).

If the result is normal, the tester server checks if an unload flag is set (S410). The unload flag is examined because the timing of the TKOUT_Req_toHost message from the test server to the host and the Unload_Req_toEQsrv message from the tester to the tester server may be flipped.

If the unload flag is set, the tester server transmits the Unload Req_toEQsrv message to the host. The host receives this message (S425) and calls the AGV to order the Load_Cmd command (S450).

In the meantime, the tester sends the Unload_Req_toHost message to the tester server (S430) and releases the cassette (S435). Receiving the Unload_Req_toHost message (S440), the tester server sets the unload flag (S445). The tester server executes its program and examines the unload flag. If this flag is set, the tester server sends the Unload_Req_toHost to the host.

The host receiving the Unload_Req_toHost message records in the database that the tester finished the job and outputs an Unload_Cmd command to the AGV (S450).

The AGV moves to the tester (S455) and communicates with the automatic sensor of the tester by wireless communication (S460,S465) and unloads the tested cassette (S470). After detecting the unloading of the cassette through the automatic sensor, the tester transmits an Unload_End_Event event to the tester server (S475).

The tester server receives this event and updates the port information in the database of the host (S485). The host may execute this process by itself if the tester server sends to the host an update request message.

Since the database in the host records each process sequentially according to the cassette and the glass ID, the repairer can process the cassette that went through the tester in the same manner as described above according to the database.

Meanwhile, the operating system of the file server used in the embodiments of the present invention can be a UNIX, a Windows NT, etc., but it is not limited thereto.

Furthermore, a communication between each machine and the file server, a communication between the file server and the machine server, a communication between the machine server and the host are realized by the network. A physical layer for networking can employ a token ring, a star or an ATM method. A protocol layer can use a TCP/IP, an IPX or a netbeui method. An application layer can use an NFS(Network File System), a netware, a WFWG(Window For Work Group), etc. All of the driving methods are not limited to those referenced above.

Furthermore, an operator directly connects the file server and can confirm the job result data (for example, defect contents, image data on defects). Therefore, the operator can directly verify the job result data in a remote spot (for instance, an office), order a special job command to the machine through the host and generate various types of statistic data according to the job result data.

Up to now, the automation system is described as an example of the tester and the repairer. However, such machines as an exposing machine, an etching machine, a sputtering machine and others that are necessary for the TFT-LCD assembly line may employ the present invention.

For example, as described below, a viewer other than a repairer may use the job result data stored in the file server.

The viewer such as an electronic microscope can connect to the file server directly or through the host and read the job result data on the glass, particularly, coordinate data of defects. If the coordinate data transmits to the viewer, the viewer automatically moves to the glasses corresponding to the coordinate data. Then, a user may confirm defect contents in person.

Furthermore, the present invention is not limited to the TFT-LCD assembly line. The present invention is used not only for a micro electronic device manufacturing such as a semiconductor, a plasma display panel, a printed circuit board and the like but also for all of the industrial field where any other machines use the job result data executed in a machine (for example, an automobile, a steel industry, a petrochemical industry).

As described above, in accordance with the present invention, all of the machines in the assembly line are connected to the file server and therefore the job result data can be shared between the machines. Therefore, the job result data executed in the previous machine are available not only for any other machines but also for various types of statistic data.

What is claimed is:

1. An automation system comprising:
    a plurality of machines;
    at least one file sever connected to the machines by a network and stores a job result data on jobs executed by the machines such that the machines may share the job result data, wherein the file server stores the job result data corresponding to all the machines and data summarizing the job result data corresponding to each of the machines;
    a plurality of machine severs respectively connected to the machines and controls the machine connected thereto; and
    a host connected to the machine servers by the network, having job information required for the machines and providing the job information to the machine servers,
    wherein the automation system is used in the fabrication of a liquid crystal display.

2. The automation system according to claim 1 further comprising a user interface enabling a user to directly use the job result data stored in the file server.

3. The automation system according to claim 1 further comprising an automatic guided vehicle (AGV) transferring a work piece to each machine.

4. The automation system according to claim 3 further comprising an AGV controller connected to the host via a cable and controlling the AGV to transfer the work piece according to a command from the host.

5. The automation system according to claim 3, wherein the AGV puts a plurality of work pieces in a moving box and transfers the moving box and the moving box has a box identifier.

6. The automation system according to claim 5, wherein the machine comprises:
    a work station for processing a job on the work piece;
    a plurality of job waiting queue for keeping the work piece before or after processing the job on the work piece; and
    a moving robot for transferring the work piece from the job waiting queue to the work station or vice versa.

7. The automation system according to claim 6, wherein the work station
    includes a first reader for identifying an identifier of the work piece and
    wherein the job waiting queue includes a second reader for identifying the box identifier and a communication device for communicating with the AGV.

8. The automation system according to claim 7, wherein the machine further comprises a work control screen for enabling a user to view the operation and operate the machines.

9. The automation system according to claim 8, wherein the work piece is a wafer and the moving box is a cassette.

10. The automation system according to claim 8, wherein the work piece is a glass and the moving box is a cassette.

11. The automation system according to claim 9, wherein the machines comprise a tester and a repairer.

12. An automation system of a micro electronic device, comprising:
    a plurality of machines including a tester for testing a substrate with patterns formed thereon, wherein the tester tests the substrate and produces the test result data, which consists of unprocessed raw data and processed summary data;
    at least one file server connected to the machines via a network, storing the job result data on the substrate processed by each machine such that the machines may share the job result data, wherein the file server stores unprocessed raw data corresponding to all the machines and processed summary data corresponding to each of the machines;
    a plurality of machine servers including a tester server, wherein each machine server connects to a corresponding machine and controls the machine connected thereto; and
    a host with a database connected to the machine servers via a network, providing the machine servers with job information required for the machines retrieved from the database on the key of an identifier of the substrate, wherein the substrate is a glass.

13. The automation system of a micro electronic device according to claim 12, further comprising a user interface enabling a user to directly use the job result data stored in the file server.

14. The automation system of a micro electronic device according to claim 12, further comprising an automatic guided vehicle (AGV) controlled by the host and transferring the substrate to each machine.

15. The automation system of a micro electronic device according to claim 14, further comprising an AGV controller connected to the host through a cable, receives a command from the host and controlling the AGV to transfer the substrate according to a command received from the host.

16. The automation system of a micro electronic device according to claim 12, wherein the machines further comprise a repairer for repairing the substrate based on the job result data processed by the tester.

17. The automation system of a micro electronic device according to claim 16, wherein the tester tests the substrate and stores test result data to the file server, and the repairer reads the test result data from the file server, utilizes the test result data in repairing the substrate and stores repair result data to the file server.

18. The automation system of a micro electronic device according to claim 17, wherein the tester tests the substrate and produces the test result data, which consist of unprocessed raw data and processed summary data, wherein the raw data are stored in the file server and the summary data are transmitted to the tester server.

19. The automation system of a micro electronic device according to claim 17, wherein the raw data includes coordinate data on defects and defect contents.

20. The automation system of a micro electronic device according to claim 12, further comprising a viewer enabling a user to directly examine the test result on the substrate using the test result data stored in the file server.

21. The automation system of a micro electronic device according to claim 20, wherein the test result data includes coordinate data on defects and the viewer moves according to the coordinate data automatically for the user to examine defect contents.

22. The automation system of a micro electronic device according to claim 12, wherein a TCP/IP method is used to connect the machines and the file server, the file server and the machine servers and the machine servers and the host.

23. The automation system of a micro electronic device according to claim 12, wherein a SECS communication method is used to connect the machines and the machine servers.

24. The automation system of a micro electronic device according to claim 12, wherein the substrate is a wafer.

25. A method for manufacturing a liquid crystal display (LCD) to control an automation system in an assembly line, comprising the steps of:
   (a) recognizing a work piece loaded in a first machine;
   (b) receiving a job command from a controller to have the first machine execute the work on the work piece;
   (c) reading a first job result data produced from the previous machine and necessary for the first machine, from a file server, wherein the file server connects to a plurality of machines including the first machine on line, and stores the job result data produced from the machines;
   (d) executing a job on the work piece in the first machine by using the first job result data; and
   (e) storing a second job result data and data summarizing the second job result data produced in the first machine to the file server, wherein the work piece is a glass.

26. The method according to claim 25, wherein the previous machine is a tester and the first machine is a repairer.

27. The method according to claim 26, wherein the work piece is a wafer.

28. A method for manufacturing a liquid crystal display (LCD) to control an automation system including a plurality of machines, each performing a job on a substrate, a controller controlling the machines and an automatic guided vehicle (AGV) transferring the substrate to each machine automatically, comprising the steps of:
   (a) loading the substrate to a first machine;
   (b) executing a job on the substrate in the first machine, and storing a first job result data and data summarizing the first job result data produced by the first machine to a file server wherein the file server is connected to the machines and stores job result data and data summarizing the job result data produced by the machines to enable the machines to share the job result data for sharing the first job result data with the machines;
   (c) unloading the substrate from the first machine;
   (d) transferring and loading the substrate to a second machine;
   (e) reading the first job data from the file server before operation of the second machine, executing a job on the substrate in the second machine by using the first job result data produced from the first machine and storing a second job result data to the file server after operation of the second machine; and
   (f) unloading the substrate from the second machine, wherein the substrate is a glass.

29. The method according to claim 28, wherein the steps (a) further comprises the steps of:
   (i) transmitting a message for the first machine requesting the substrate to controller;
   (ii) finding out the substrate to be processed in the first machine by retrieving an information in a database included in the controller and ordering the AGV to load the substrate to the first machine; and
   (iii) reading an identifier of the substrate if the substrate loads to the first machine and informing an end of loading of the controller.

30. The method according to claim 29, wherein the steps (b) further comprises the steps of:
   (i) determining if the controller is workable according to the information on the key of the identifier of the substrate, if workable, ordering job start command with the information to the first machine; and
   (ii) executing a job on the substrate, storing the first job result data to the file server and informing an end of job of the controller.

31. The method according to claim 30, wherein the steps (c) further comprises the steps of:
   (i) reading the first job result data from the file server, processing the first job result data and ordering an unloading of the substrate to the AGV;
   (ii) unloading the processed substrate from the first machine; and
   (iii) informing an end of unloading of the controller if unloading is over.

32. The method according to claim 31, wherein the steps (d) further comprises the steps of:

(i) informing the second machine of location where the first job result data and a second job result data to be produced for the second machine are stored; and (ii) executing a job by reading the first job result data from the file server and storing the second job result data to the file server.

33. The method according to claim 32, wherein the first machine is a tester and the second machine is a repairer.

34. The method according to claim 33, wherein the substrate is a wafer.

* * * * *